United States Patent [19]

Ruohio et al.

[11] Patent Number: 5,655,425
[45] Date of Patent: Aug. 12, 1997

[54] METHOD AND ASSEMBLY FOR STOPPING A SET OF ROLLS

[75] Inventors: Raimo Ruohio, Koski HL; Mauri Hillo, Hikiä, both of Finland

[73] Assignee: Valmet Corporation, Helsinki, Finland

[21] Appl. No.: 531,229

[22] Filed: Sep. 19, 1995

[30] Foreign Application Priority Data

Sep. 21, 1994 [FI] Finland ................ 944376

[51] Int. Cl.⁶ .................. B26D 7/06
[52] U.S. Cl. .................. 83/27; 83/102; 83/407; 83/949; 193/32; 198/633; 198/463.4; 414/911
[58] Field of Search ........... 193/32; 198/345.1, 198/458, 633, 463.4, 434; 83/27, 102, 407, 949, 155, 148, 110; 414/911

[56] References Cited

U.S. PATENT DOCUMENTS

| | | | |
|---|---|---|---|
| 2,562,035 | 7/1951 | Hileman | 193/32 |
| 2,846,041 | 8/1958 | Shepard | 198/32 |
| 2,979,979 | 4/1961 | Hearden et al. | 83/407 |
| 3,317,025 | 5/1967 | Schickle | 198/463.4 |
| 3,370,494 | 2/1968 | Schenck | 198/633 |
| 4,134,485 | 1/1979 | George | 198/434 |
| 4,289,229 | 9/1981 | Keller | 198/633 |
| 4,487,309 | 12/1984 | Dorner | 198/633 |
| 4,696,616 | 9/1987 | Avey | 414/911 |
| 5,168,976 | 12/1992 | Kettelson | 198/345.1 |
| 5,211,276 | 5/1993 | Clopton | 198/345.3 |
| 5,314,295 | 5/1994 | Lukkari et al. | 414/911 |

*Primary Examiner*—William E. Terrell
*Assistant Examiner*—Khoi H. Tran
*Attorney, Agent, or Firm*—Cohen, Pontani, Lieberman & Pavane

[57] ABSTRACT

The present invention relates to a method and apparatus for stopping a roll set, quickly in a controlled fashion. Typically, such a roll set is comprised of a plurality of rolls which is launched from a slitter wherefrom it is rolled along a downward ramp to a conveyor. On the downward ramp, on the side of the conveyor opposite the ramp is a number of adjacent stop gages suited for being controlled to a home position and an operating position, respectively. For each roll, a required number of the stop gages located along the rolling path of the roll is selected to operate, while the rest of the stop gages are left in their home positions. In this fashion, each roll can be stopped individually even when the rolls move simultaneously and, moreover, the stopping force can be adjusted separately for each roll.

20 Claims, 2 Drawing Sheets

METHOD AND ASSEMBLY FOR STOPPING A SET OF ROLLS

FIELD OF THE INVENTION

The present invention relates to a method for stopping a set of multiple rolls, often referred to in short as a roll set, in a controlled fashion.

The invention also relates to apparatus for implementing the method.

THE PRIOR ART

In paper mills the web is manufactured in machine wide widths which is then spooled into a roll having a width equal to the full web width, e.g. machine wide rolls. The machine wide rolls must be slit into rolls or narrower width according to order prior to their delivery to the customer. Slitting is performed on a slitter in which the machine wide roll is unwound, and the web is slit into narrower trimmed webs which are rewound again into narrower rolls. The widths of the narrower rolls produced on the slitter are adjusted according to orders received from customers, and a single machine wide roll may conventionally be slit into narrow rolls of different widths. The ready-wound rolls of narrower width are ejected from the slitter onto the downward ramp, on which they roll down to a conveyor that takes the rolls to the wrapping area. The rolls may leave the slitter in close proximity to one another. However, the rolls are preferably somewhat spaced apart on the conveyor and at the wrapping stations. The rolls are arranged in a proper order and at proper mutual distances on the conveyor by separating the ready-slit rolls into sets. Each set comprises those rolls that are desired to be loaded sequentially onto the conveyor. The rolls slit from the machine wide roll are separated into sets either on the slitter, whereby the slitter separates the sets to both sides of the slitter. Alternatively, all such rolls are ejected from the slitter along a single downward ramp and then stopped by means of stop flaps placed on the downward ramp, whereby the flaps release the rolls to roll to the conveyor in a predetermined order. Similar handling needs occur also for roll sets received from other stations and, e.g., in the reception of roll sets transferred from rolls stores when the sets are being transferred down ramps. Hence, a set can be defined as such a set of rolls which is received from a slitter or the roll in the set may already have been separated from each other but still require simultaneous stopping as they progress from some other station. The transfer of such a roll set may involve the use of car conveyors, lifts or ramp systems.

Roll sets riling down a ramp to a conveyor must obviously be stopped on the conveyor without causing damage to the rolls. The stopping of a set is conventionally implemented with the help of a downward retractable stop gage having a width equal to the full width of the entire set, or alteratively, with the help of a fixed, slanted stop gage. Both prior art stopping methods have several shortcomings. For instance, when a roll leaving the ramp meets the slanted stop gage, the inertia of the roll will force it to proceed upward along the slanted surface of the gage and then roll back again onto the ramp. The roll will continue its rolling back and forth until its kinetic energy is exhausted and the roll stops on the conveyor. The oscillatory rolling motion may cause damage to the roll. The web wound on and making up the roll may break under the roll surface where the break is unseen and cause unwinding of the roll if the glue bond of the roll tail fails. As a slitter may not necessarily involve continuous monitoring by the shift personnel, defective rolls can easily reach the shipping system causing defect reports from that section of the line. If, however, the damage on the roll is found, the damaged layers are removed and the tail of the web is reattached to the roll using self-adhesive tape. The stopping situations of a set often involves a risk of injury particularly when manual stopping of a roll is attempted prior to the natural stopping of its oscillatory motion. Such rolls often weight several tons and the kinetic energy of such a roll is extremely high, even at slow speeds, and as a plurality of rolls exist on the ramp during the transfer phase, the risk of becoming knocked by the rolls is high. Manual stopping of the rolls may also be attempted to speed the operation of the line as the oscillatory motion of the rolls slows down the operating speed of the line.

A downward retractable, full-width stop gage is less frequently employed than a slanted stop gage. This type of stop gage is operated in the same fashion as the stop gages of the conveyor system. As the roll hits the stop gage, the gage retracts and simultaneously slows down the roll motion and finally stops the roll in a controlled fashion on the conveyor. However, these stops operate most reliably when stopping roll of weights for which they have been adjusted. Because the roll sizes incoming from the slitter vary widely, the function of the stop gage cannot be adjusted optimally. An even more serious problem surpassing that involving the stop gage control arises from the nonsimultaneous arrival of the rolls on the stop gage. Then the stop gage commences its retraction movement upon the first roll contacting the gage, whereby the subsequent rolls hit a retracting or even stationary stop gage. If the end position of the roll braking motion of the stop gage is flush with the floor level, the rolls may continue rolling over and past the stop gage further along the floor of the mill, potentially causing injury and/or damage. Hitting a stationary stop gage can easily damage the roll, whereby the damaged web layers must be removed from the roll which results in a disturbance in the operation of the line. In the opposite case of insufficient line monitoring, the defective rolls may be shipped to the customer. The differences in the rolling speed of the rolls on the ramp may be caused by, i.e. the surface hardness differences between the individual rolls which can cause appreciable variation in the rolling speed of the rolls.

OBJECTS AND BRIEF DESCRIPTION OF THE INVENTION

It is an object of the present invention to achieve a method and an apparatus for stopping a roll set in a controlled fashion incoming from a slitter or similar station onto a conveyor without causing damage to the rolls.

This and other objects of the invention are accomplished by providing a downward ramp with a plurality of adjacent stop gages which can be controlled to their operating or stopping and home or retracted positions, respectively. A required number of the stop gages disposed along the rolling path of the rolls is controlled to operate separately for each roll, while the rest of the stop gages are left in their home positions.

According to the most advantageous embodiment of the invention, the principle of the invention is implemented in conjunction with a slitter so that the downward ramp in front of the conveyor that is provided with a number of adjacent stop gages on the opposite side of the conveyor, the stop gages being operative to either their operating or home positions. For each roll, a required number of the stop gages is selected to operate, while the rest of the stop gages are left in their home positions.

The invention offers significant benefits.

The transfer of rolls by means of a downward ramp from a slitter or other station can be implemented in a controlled fashion irrespective of a wide size distribution of the rolls. The stopping force may be controlled in a variety of fashions by controlling the stop gages individually and by varying the number of stop gages used for stopping a specific roll, or both. In addition to the roll width, the roll diameter may also vary. Hence it is additionally desirable to control the stopping power of the stop gages so that rolls of different weight but of equal width can be stopped without causing damage to the rolls. Surface damage to the rolls is reduced, because the rolls are prevented from hitting fixed or stationary stop gages at a high speed. The function of stop gages performing the stopping of a specific roll is entirely independent from the operation of the other stop gages. Selected stop gages can be lowered to their home positions substantially flush with the floor level, whereby certain rolls may be allowed to pass over the conveyor, while the rest of the rolls can be stopped on the conveyor. The individual stop gages have a design that provides a satisfactory function even if the stopping force is incorrectly set for the roll size to be handled. Consequently, the risk of damage in conjunction with malfunction situations is reduced. The function of the stop gages can also be readily controlled manually, while the optimum controllability and most flexible function are achieved by connecting the stop gage system to control computer of the slitter and conveyor system. Then, the stopping effect and number of the stop gages can be set separately for each roll on the basis of roll information stored in the control system. The separating flaps presently in use can be replaced by the stop gage system according to the invention, whereby the rolls can be stopped smoothly also on the separating flaps.

Other objects and features of the present invention will become apparent from the following detailed description considered in conjunction with the accompanying drawings. It is to be understood, however, that the drawings are designed solely for the purposes of illustration and not as a definition of the limits of the invention, for which reference should be made to the appended claims.

BRIEF DESCRIPTION OF THE DRAWINGS

The invention is described in greater detail in the following specification with reference to the appended drawings in which.

DETAILED DESCRIPTION OF THE PRESENTLY PREFERRED EMBODIMENTS

Figure 1:
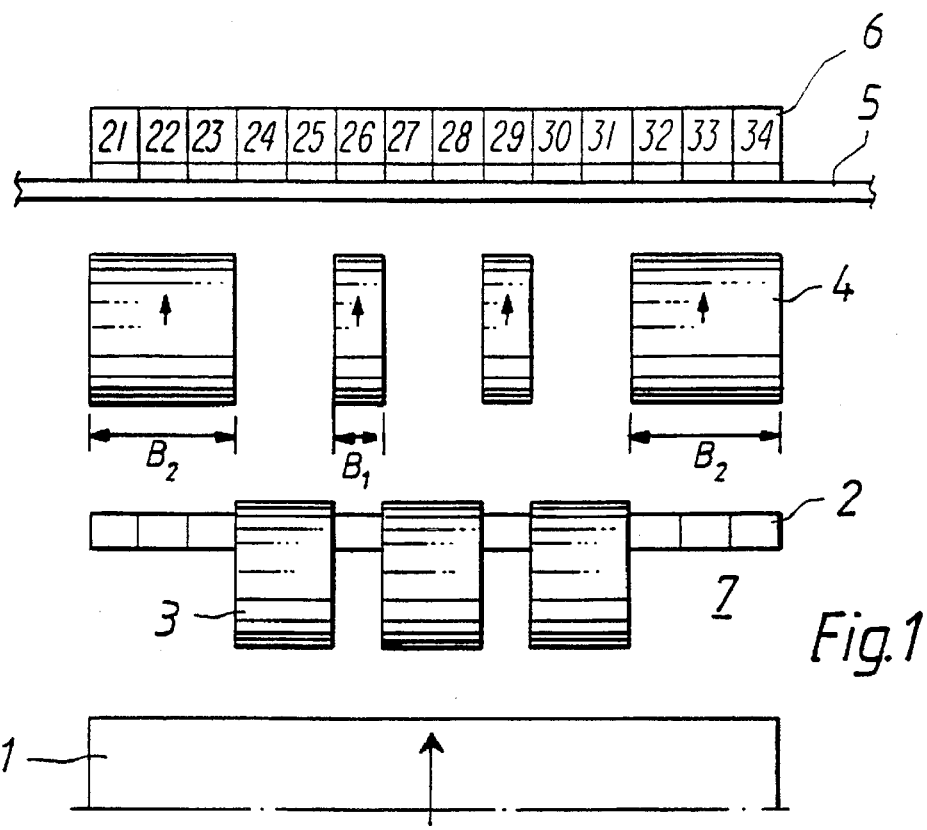
FIG. 1 illustrates diagrammatically a set of rolls incoming from a slitter, and a stop gage system according to the present invention.

Referring now to FIG. 1 in detail, the system according to the invention is illustrated in cooperation with a slitter 1 which is shown ejecting slit rolls 3, 4 to the same side of the slitter. The invention can also be adapted to slitters that separate the rolls to the opposite sides of the slitter station, and further, can be used with other equipment in which the rolls are transferred from other locations along a downward sloping ramp. The rolls, 3, 4 rotate along a downwardly sloping ramp 7 to separating flaps 2. The separating flaps 2 first stop the rolls 3, 4 on the ramp 7 and then release a portion of the rolls to roll further along the ramp 7 to a conveyor 5 at or adjacent the bottom of ramp 7. Specifically the remainder of the rolls are retained behind the separating flaps 2, while the first mentioned portion, now released, is allowed to rotate further along ramp 7 to the conveyor 5 behind which are located the roll set stop gages 6. In this case the number of stop gages 6 is fourteen and they are number sequentially in FIG. 1 by consecutive numbers from 21 to 34. Of course, other numbers of stop gages 6 may be employed.

The first set comprising rolls 4 has wide rolls at the sides and two narrow rolls at the center. The width of the individual stop gage 6 is preferably equal to the width B of the narrowest roll to be received from the slitter shown as $B_1$. Hence, the total width of the stop gage system is preferably determined by the width of the rolls to be received from the slitter and by using a large number of narrow-width stop gages, the system may be made extremely flexible, although obviously the system price may become higher when the number of stop gages is increased. Furthermore, it is advantageous to adopt the width of the stop gages 6 to the width distribution of the rolls to be manufactured so that the roll widths will be an integral multiple of the width of the stop gages; however, this requirement is not by any means necessary, since the stop gages need not necessarily extend over the entire width of a roll.

Figure 2:
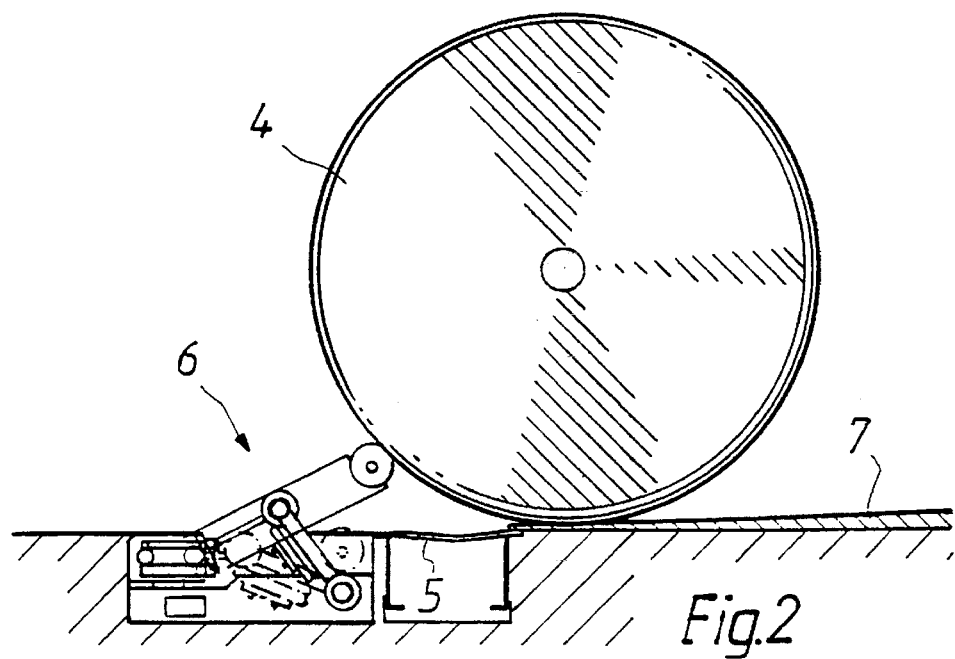
FIG. 2 illustrates a stop gage according to the present invention at the point of time when a roll hits against a stop.
Figure 3:
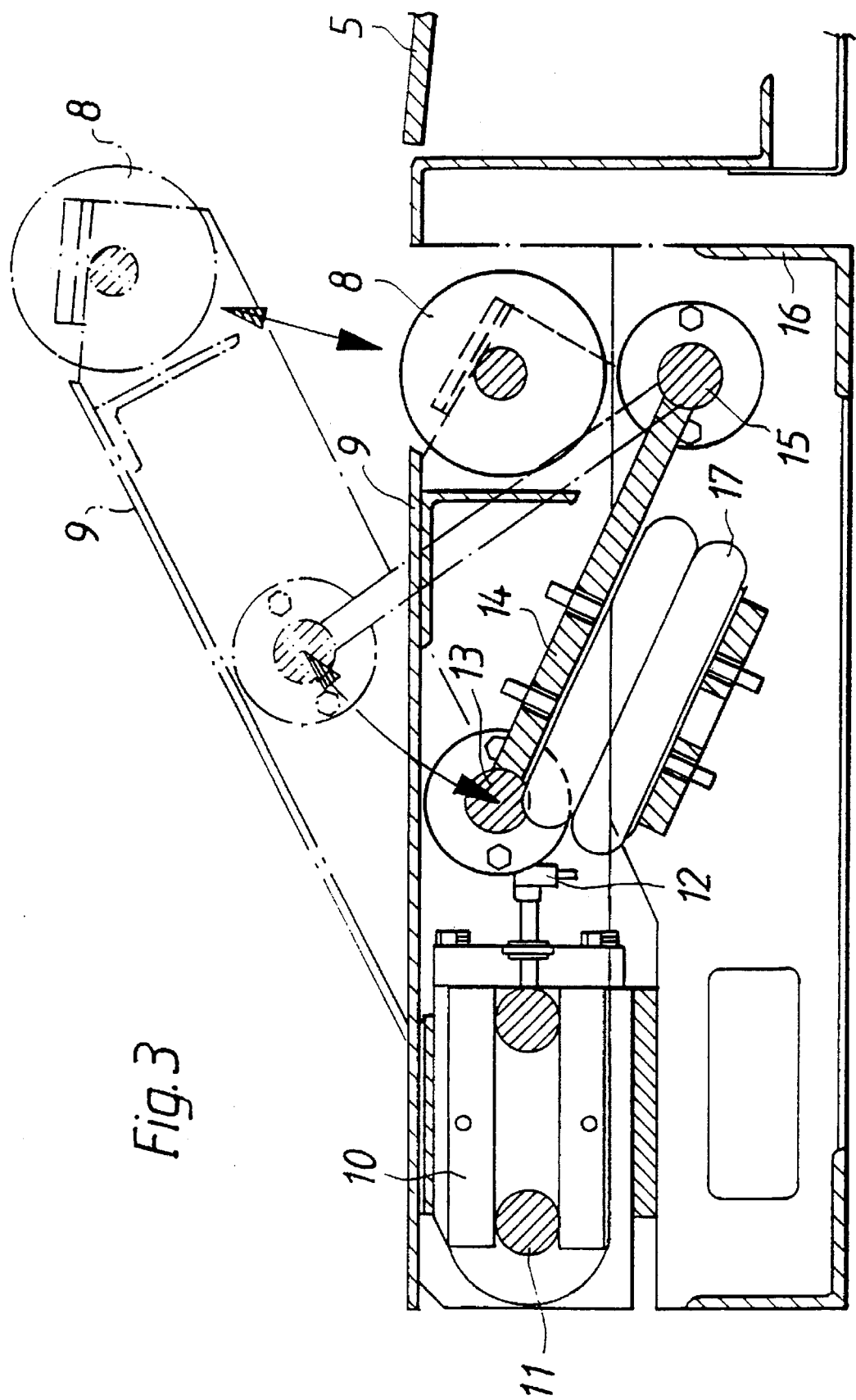
FIG. 3 illustrates in enlarged scale the detail of the stop mechanism as shown in FIG. 2.

Now referring to FIGS. 2 and 3, the roll 4 is shown hitting one or more of the stop gages 6. The roll 4 first hits the stop gage at a roller 8 which is rotatably mounted on bearings on a moving stop lever 9 (FIG. 3). The opposite end of the lever 9 is connected to a pivot 11 which is slidably supported in a slot 10. By means of a pivotal joint 13, at the center point of the stop lever 9, the lever 9 is attached to one end of a guide lever 14, the other end of which is attached by means of a pivotal joint 15 to a stop gage body 16. An air cushion bellows 17 is located under the guide lever 14 between the guide lever and a stationary stop 18 fixed to the gage body 16. As shown, bellows 17 is connected to stop 18, although it could alternatively be connected to and move with guide lever 14. The stop gage 6 is placed alongside the conveyor 5 so that in its operated or raised position, the roll 8 is approximately aligned with the edge of the conveyor 5.

When a set of slit rolls 3, 4 is ejected from the slitter 1, the number of individual stop gages 6 and their location are selected in a set cushion stop system so as to cope with the location and width of the rolls 3 in the set. The unselected stop gages are controlled to operate to their home or restricted positions, whereby they remain flush with the floor level. Each stop gage 6 may be adjusted pneumatically according to the minimum-size roll, whereby the stopping power for larger rolls is selected by controlling a greater number of stop gages to operate simultaneously in the stopping of the roll. In the situation illustrated in FIG. 1, the stop gages 21, 22, 23, 26, 29, 32, 33 and 34 are controlled to operate for stopping the rolls 4. For the stopping of rolls 3, the stop gages 24, 25, 27, 28, 30 and 31 are controlled to operate. The selection of the stop gages may be done manually from a control panel. Alternatively, the selection may be linked to the control of the slitter 1 or the separating flaps 2. The position signal of the separating flaps 2 is readily available, because the selection of the separating flaps 2 can be directly connected to the selection of the stop gages 6. The position of the stop gages is sensed by means of a sensor 12 mounted on the slot 10.

As the roll 4 hits the roller 8 of the stop gage, the stop lever 9 of the stop gage 6 begins sliding backward along the slot 10. The path or direction of the lever 9 and the roller 8 is controlled by the guide lever 14 so that the movement of the roller 8 is principally in a downward direction. The translational speed of the stop gage is controlled by means of the inflation pressure of the air-cushion bellows 17 located below the guide lever 14. The basic adjustment of bellow pressure may be, e.g., such that it provides suitable stopping power by the stop gage for the lightest rolls to be handled, and for rolls of larger width, a greater number of stop gages is activated to provide more stopping power. If the diameter of the rolls changes, the stopping power may be increased by elevating the inflation pressure of the air-cushion bellows. For a number of reasons, the air-cushion bellows is a particularly advantageous device for generating the stopping power. For instance, the area of the bellows is large, whereby a high stopping power is achieved at a low pressure. A bellows is not sensitive to changes in roll size, because the stopping power generated by the bellows increases when the bellows volume is compressed whereby the bellows automatically compensates for the impacts caused by oversized rolls. Even during a malfunction situation, the stop gage can received the roll with a relatively gentle stopping action.

Obviously, other types of stop gages can be employed from that described above. In principle, all conventional stop gage constructions are suitable for use in the method according to the invention. However, stop gages like those described above operated to a home position fully flush with the floor level and thus facilitate the transfer of the rolls. The home and operating positions of the gage need not necessarily be different positions in the physical sense, but rather the stop gage may be controlled to its "home" position by adjusting the stopping power of the gage sufficiently low, whereby the gage will not significantly brake the movement of the roll so that from an operational viewpoint it is out of the roll path. The stopping power may also be generated by electromechanical or hydraulic means, while the pneumatic means are preferred because of their soft or cushioning action. Further, the stopping power generated by pneumatic devices is easy to control.

The most typical application of the invention is in the stopping of a roll set coming from a slitter onto a conveyor. Obviously, the invention may be employed in other similar applications as the same factors should be considered whenever it is necessary to stop rolls transferred along a ramp from one location to another. For example, the rolls to be transferred may be received from, e.g., another conveyor or from a roll store. The linear row of stop gages according to the invention is capable of replacing stop flaps in a fashion that can stop the rolls on the downward ramp, and the braking-type stop gages will provide a smoother and more controlled stopping than conventional separating flaps. By virtue of the smoother stopping, improved occupational safety is achieved as the oscillatory motion of the rolls is eliminated, and simultaneously, higher rolling speeds can be used; that is, longer and steeper graded downward ramps can be used to speed up the transfer.

While the above specification has described the preferred forms of the present invention and various modifications thereof, other forms and modifications may be made within the scope of the appended claims without departing from the spirit and scope of the invention.

What is claimed is:

1. A method of stopping the rolling movement of one or more rolls in a roll set using stop gages operative between a home position in which the stop gauge is substantially operatively out of the path of movement of said rolls and an operating or stopping position in which said stop gage is in said path, said method comprising:
    a) for each roll to be stopped, selecting from a line of a plurality of said stop gages at least one stop gage in said operating position disposed in the page of movement of said roll to be stopped;
    b) operating the remaining stop gages in said line of stop gages to said home position; and
    c) stopping said roll to be stopped by permitting said selected at least one stop gage to yield to said roll to gradually slow down and stop its motion.

2. The method of claim 1, wherein the rolling movement is imparted to said rolls by disposing them on a ramp sloping downwardly toward said line of stop gages.

3. The method of claim 1, used to stop said rolls while said rolls are on a conveyor said method further comprising locating said conveyor adjacent the bottom of said ramp and locating said line of gages adjacent the side of said conveyor opposite said ramp.

4. The method of claim 1, further comprising controlling stopping power exerted by said gages on said roll to be stopped by varying the number of stop gages selected and operated to said stopping position.

5. The method of claim 1, further comprising controlling the stopping power exerted by said gages on said roll to be stopped by varying a force necessary to cause said at least one stop gage to yield to said roll to be stopped.

6. The method of claim 4, further comprising additionally controlling the stopping power exerted on said roll to be stopped by controlling a force necessary to cause said at least one gage to yield to said roll to be stopped.

7. The method of claim 5, wherein a plurality of stop gages is selected to stop said roll, and the force necessary to cause each of said selected stop gages to yield is individually adjusted for each stop gage.

8. The method of claim 2, wherein said roll set is formed by a slitter adjacent the elevated end of said ramp.

9. The method of claim 8, wherein separating flaps are disposed on said ramp for separating said rolls into one or more rolls sets, and the step of selecting said stop gages is dependent on the position of said separating flaps.

10. The method of claim 8, further comprising separating said rolls into two or more roll sets on said slitter by guiding said rolls toward one side of said slitter or to the other, and wherein said stop gages are selected on the basis of roll position information obtained from said slitter.

11. Apparatus for selectively stopping rolls from a roll set moving along predetermined paths, comprising:
    a) A downwardly sloping ramp for imparting rolling movement to the rolls in said roll set;
    b) a plurality of stop gages arranged in a line extending crossways of the slope of said ramp adjacent the bottom of said ramp, said stop gages being selectively actuatable to a home position and an operated or extended position; and
    c) means for selectively actuating to the extended position one or more stop gages disposed in the path of a roll whereby said selected stop gage yields to said roll to gradually slow down and stop its motion.

12. The apparatus as defined in claim 11, further comprising a slitter located adjacent the elevated end of said ramp for slitting a machine-wide roll into said roll set.

13. The apparatus of claim 12, said slitter being arranged for slitting said machine-wide rolls into said roll set comprising rolls of different widths, and width of said stop gages being substantially equal to the width of the narrowest of said rolls.

14. The apparatus of claim 11, wherein at least one of said stop gages comprises:

a) a stop gage body;

b) a slide guide mounted on said body;

c) a stop lever movable between a home or retracted position substantially within said body and an operating or extended position in which a portion of said stop lever extends above said body for engaging and stopping a roll;

d) a pivot fixed to one end of said stop lever, said pivot being slidably mounted on said slide guide for sliding movement between a retracted and an extended position concomitantly with the movement of said stop lever between its retracted and extended positions, respectively;

e) a guide lever pivotally mounted at one end to said stop gage body and pivotally mounted at its other end to substantially situated at a center of said stop lever for movement between a retracted and an extended position concomitantly with the movement of said stop lever between its retracted and extended positions, respectively;

f) a stop connected to said stop gage body in spaced confronting relation with said guide lever when said guide lever is in said retracted position; and g) a pneumatic cushioning element disposed between said stop and said guide lever for cushioning the guide lever as it moves from said extended to said retracted position for slowing and ultimately stopping said roll.

15. The apparatus of claim 14, wherein each of said stop gages is comprised of the same elements as said at least one of said stop gages.

16. The apparatus of claim 14, said at least one stop gage further comprises a roller rotatably mounted on said stop lever at an end opposite to an end mounted of said slide guide.

17. The apparatus of claim 14, wherein said pneumatic cushioning element is an inflated bellows, and further comprising means for adjusting the inflation pressure in said bellows.

18. A stop gage for stopping a rotatably moving rolling, comprises:

a) a body;

b) a slide guide mounted on said body;

c) a stop lever movable between a home or retracted position substantially within said body and an operating or extended position in which a portion of said stop lever extends above said body for engaging and stopping a roll;

d) a pivot fixed to one end of said stop lever, said pivot being slidably mounted on said slide guide for sliding movement between a retracted and an extended position concomitantly with the movement of said stop lever between its retracted and extended positions, respectively;

e) a guide lever pivotally mounted at one end to said stop gage body and pivotally mounted at its other end and substantially located at a center of said stop lever for movement between a retracted and an extended position concomitantly with the movement of said stop lever between its retracted and extended positions, respectively;

f) a stop connected to said stop gage body in spaced confronting relation with said guide lever when said guide lever is in said retracted position; and g) a pneumatic cushioning element disposed between said stop and said guide lever for cushioning said guide lever as it moves from said extended to said and retracted position for slowing and ultimately stopping said roll.

19. The stop page of claim 18, further comprising a roller rotatably mounted on said stop lever at an end opposite an end mounted in said slide guide.

20. The stop gage of claim 18, wherein said pneumatic cushioning element is an inflated bellows, and further comprising means for adjusting the inflation pressure in said bellows.

* * * * *